United States Patent
Hara et al.

(10) Patent No.: US 7,500,538 B2
(45) Date of Patent: Mar. 10, 2009

(54) CONTROL UNIT FOR ELECTRIC POWER STEERING APPARATUS

(75) Inventors: Takeshi Hara, Gunma (JP); Shuji Endo, Gunma (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 24 days.

(21) Appl. No.: 11/587,972

(22) PCT Filed: Apr. 15, 2005

(86) PCT No.: PCT/JP2005/007659

§ 371 (c)(1),
(2), (4) Date: Oct. 30, 2006

(87) PCT Pub. No.: WO2005/105550

PCT Pub. Date: Nov. 10, 2005

(65) Prior Publication Data

US 2007/0225885 A1    Sep. 27, 2007

(30) Foreign Application Priority Data

Apr. 30, 2004   (JP)   ............... 2004-135531

(51) Int. Cl.
*B62D 5/00*   (2006.01)
*B62D 7/00*   (2006.01)

(52) U.S. Cl. .............. 180/412; 180/413; 701/41; 701/42; 701/43

(58) Field of Classification Search ............. 180/402, 180/412, 413, 416, 421, 415; 701/29, 43, 701/41, 42

See application file for complete search history.

(56) References Cited

U.S. PATENT DOCUMENTS

| | | | | |
|---|---|---|---|---|
| 5,101,922 A | * | 4/1992 | Ohmura | 180/445 |
| 5,457,632 A | * | 10/1995 | Tagawa et al. | 701/43 |
| 5,999,870 A | * | 12/1999 | Tatsumi et al. | 701/43 |
| 6,018,691 A | * | 1/2000 | Yamamoto et al. | 701/41 |
| 6,496,762 B2 | * | 12/2002 | Kurishige et al. | 701/41 |
| 6,527,079 B2 | * | 3/2003 | Takeuchi et al. | 180/443 |
| 6,580,989 B1 | * | 6/2003 | Husain et al. | 701/41 |
| 6,691,008 B2 | * | 2/2004 | Kondo et al. | 701/41 |
| 6,705,420 B2 | * | 3/2004 | Ono et al. | 180/407 |
| 6,838,846 B2 | * | 1/2005 | Matsuoka | 318/432 |
| 6,929,086 B1 | * | 8/2005 | Husain et al. | 180/413 |

(Continued)

FOREIGN PATENT DOCUMENTS

GB   2 229 276 A   9/1990

(Continued)

*Primary Examiner*—Toan C To
(74) *Attorney, Agent, or Firm*—Sughrue Mion PLLC (57) ABSTRACT

It is an object of the present invention to provide a control unit for an electric power steering apparatus for accurately detecting an abnormality of a steering angle sensor without forming the steering angle sensor as a double system or using an expensive position detection sensor. The object is achieved by calculating a relative steering angle by using inexpensive position detection sensors disposed at a motor of the electric power steering apparatus to output binary values and comparing a change amount of an absolute steering angle detected by the steering angle sensor and a change amount of the calculated relative steering angle with each other to thereby detect the abnormality of the steering angle sensor.

4 Claims, 10 Drawing Sheets

U.S. PATENT DOCUMENTS

| | | | |
|---|---|---|---|
| 6,938,721 B2 * | 9/2005 | Ono et al. | 180/402 |
| 7,187,153 B2 * | 3/2007 | Imagawa et al. | 318/638 |
| 2003/0168276 A1 | 9/2003 | Kimura et al. | |
| 2005/0171667 A1 * | 8/2005 | Morita | 701/43 |
| 2005/0234614 A1 * | 10/2005 | Sakurai et al. | 701/29 |

FOREIGN PATENT DOCUMENTS

| | | |
|---|---|---|
| JP | 11-342859 A | 12/1999 |
| JP | 2002-104211 A | 4/2002 |
| JP | 2002-272161 A | 9/2002 |
| JP | 2003-252228 A | 9/2003 |
| JP | 2004-64921 A | 2/2004 |

* cited by examiner

| HS3 (bit 2) | HS2 (bit 1) | HS1 (bit 0) | $S_n$ |
|---|---|---|---|
| 0 | 0 | 0 | 0 |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 |

| $S_{n-1}$ \ $S_n$ | 1 | 2 | 3 | 4 | 5 | 6 |
|---|---|---|---|---|---|---|
| 1 | 0 | E | CW | E | CCW | E |
| 2 | E | 0 | CCW | E | E | CW |
| 3 | CCW | CW | 0 | E | E | E |
| 4 | E | E | E | 0 | CW | CCW |
| 5 | CW | E | E | CCW | 0 | E |
| 6 | E | CCW | E | CW | E | 0 |

FIG.5

| $S_{n-1}$ \ $S_n$ | 0 | 1 | 2 | 3 | 4 | 5 | 6 | 7 |
|---|---|---|---|---|---|---|---|---|
| 0 | E | E | E | E | E | E | E | E |
| 1 | E | 0 | E | CW | E | CCW | E | E |
| 2 | E | E | 0 | CCW | E | E | CW | E |
| 3 | E | CCW | CW | 0 | E | E | E | E |
| 4 | E | E | E | E | 0 | CW | CCW | E |
| 5 | E | CW | E | E | CCW | 0 | E | E |
| 6 | E | E | CCW | E | CW | E | 0 | E |
| 7 | E | E | E | E | E | E | E | E |

CONTROL UNIT FOR ELECTRIC POWER STEERING APPARATUS

TECHNICAL FIELD

The present invention relates to a control unit for an electric power steering apparatus for applying a steering assist force by a motor to a steering system of an automobile or a vehicle and especially to a control unit for an electric power steering apparatus for detecting an abnormality of a steering angle sensor for detecting a steering angle of a steering shaft.

BACKGROUND TECHNIQUE

Figure 12:
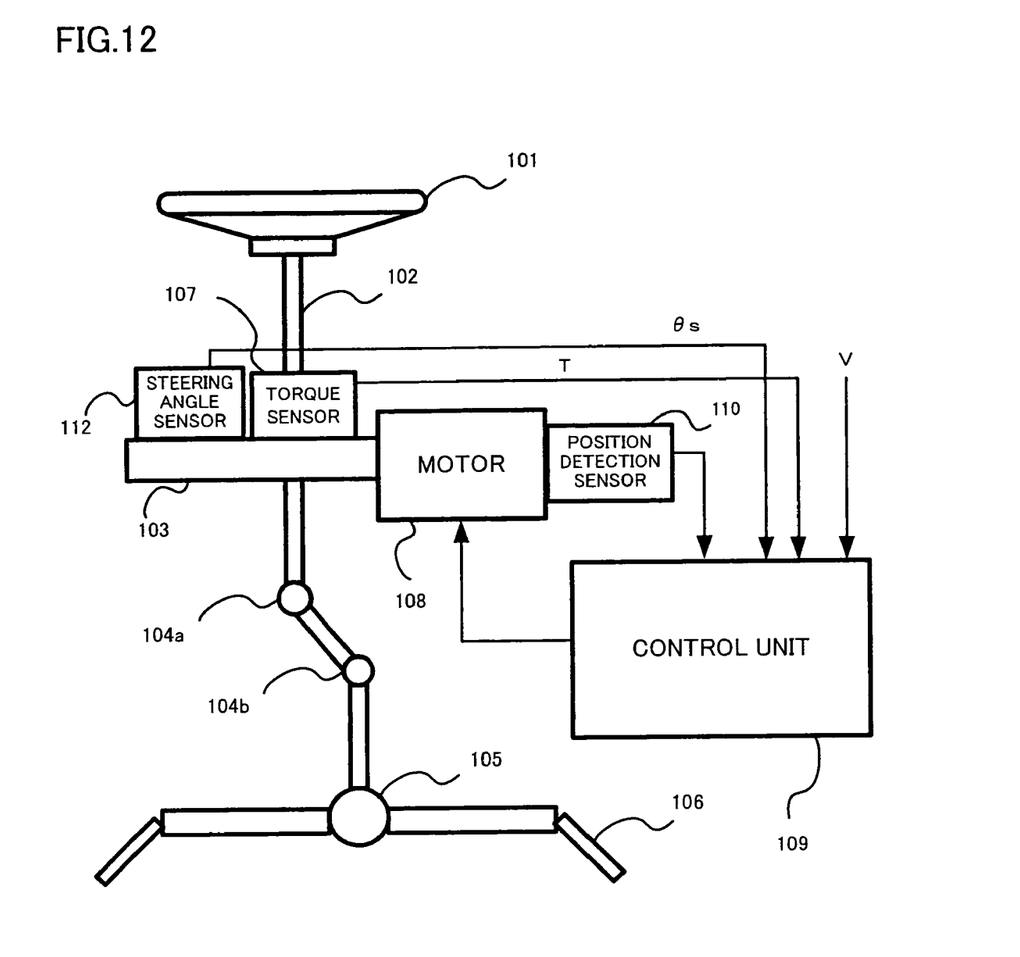
FIG. 12 is a block diagram of an electric power steering apparatus.

An electric power steering apparatus for applying a steering assist force to a steering mechanism of an automobile by a rotating force of a motor transmits a driving force of the motor by a transmitting mechanism such as a gear and a belt through a reduction gear to apply the steering assist force to a steering shaft or a rack shaft. A simple structure of such an electric power steering apparatus is shown in FIG. 12 and will be described with reference to the drawing.

A shaft 102 of a steering wheel 101 is coupled to tie rods 106 of steered wheels through a reduction gear 103, universal joints 104a and 104b, and a pinion rack mechanism 105. The shaft 102 is provided with a torque sensor 107 for detecting steering torque of the steering wheel 101 and a motor 108 for assisting a steering force of the steering wheel 101 is coupled to the shaft 102 through the reduction gear 103. The motor of the electric power steering apparatus is controlled by a control unit 109 by inputting a torque value T detected by the torque sensor 107, a vehicle speed V detected by a vehicle speed sensor (not shown), a rotation angle of the motor detected by a position detection sensor 110 for detecting a rotation position of the motor, and further a steering angle θs detected by a steering angle sensor 112 attached to the reduction gear 103, or the like to the control unit 109. The control unit 109 is mainly formed of a CPU and performs a motor control by using a program in the CPU.

The detected steering angle is used for an attitude control of the vehicle or used for controlling the electric power steering apparatus. Therefore, if the steering angle sensor comes into an abnormal condition, it is unfavorable to use the erroneous steering angle detected by the steering angle sensor for control and therefore, it is necessary to detect the abnormality of the steering angle sensor without delay. It is conceivable to form the steering angle sensor as a double system, but it increases the cost and thus other various abnormality detecting means have been devised.

There is a means for detecting an abnormality of a steering angle sensor as disclosed in Japanese Patent Application Laid-open (JP-A) No. 2002-104211, wherein a steering angle estimated from terminal voltage of a motor and motor current and a steering angle detected by the steering angle sensor 112 are compared with each other to detect the abnormality of the steering angle sensor.

There is one disclosed in JP-A No. 2003-252228, wherein a steering angle detected by a steering angle sensor 112 and a steering angle estimated from a motor rotation angle detected by a position detection sensor 110 for detecting the rotation position of the motor are compared to each other to detect an abnormality of the steering angle sensor.

DISCLOSURE OF THE INVENTION

Problems to be Solved by the Invention

However, with the steering angle estimated from the terminal voltage of the motor and the motor current, it is difficult to detect the steering angle with accuracy. Moreover, in order to accurately detect the steering angle by using the motor position detection sensor, it is necessary to employ an expensive position detection sensor such as a resolver as the position detection sensor.

The present invention has been made in view of the above-described circumstances, and the object of the invention is to provide a control unit for an electric power steering apparatus for detecting an abnormality of a steering angle sensor by accurately estimating a relative steering angle by using an inexpensive motor position detection sensor.

Means to Solve the Problems

The present invention relates to a control unit for an electric power steering apparatus including a steering angle sensor for detecting a steering angle of a steering shaft and controlled to apply a steering assist force by a motor to a steering system of a vehicle and, to achieve the above object of the invention, the control unit includes: a plurality of position detection sensors for outputting binary values according to a rotation position of the motor; relative steering angle detecting means for detecting a relative steering angle of the steering shaft from binary outputs of the position detection sensors; and abnormality determining means for determining that the steering angle sensor or the relative steering angle detecting means is abnormal when a difference between a change amount of the steering angle and a change amount of the relative steering angle is greater than a predetermined value to output an abnormality signal.

To further effectively achieve the above object of the invention, the control unit further includes self-diagnostic means for determining an abnormality of the relative steering angle, the control unit determining that the steering angle sensor is abnormal when the abnormality determining means outputs the abnormality signal and the self-diagnostic means determines that the relative steering angle is normal.

Moreover, to further effectively achieve the above object of the invention, the control unit further includes steering angle interrupting means for interrupting input of the steering angle from the steering angle sensor, the input of the steering angle output from the steering angle sensor is interrupted by the steering angle interrupting means when the abnormality determining means outputs the abnormality signal and the motor is controlled without using the steering angle.

BEST MODE FOR CARRYING OUT THE INVENTION

The present invention is formed of a relative steering angle estimating portion for estimating a relative steering angle that is a relative steering angle by using inexpensive motor position detection sensors and an abnormality determining portion for determining an abnormality by comparing a steering angle detected from a steering angle sensor and the estimated relative steering angle with each other.

First, a theory of the former relative steering angle estimating portion for estimating the relative steering angle that is the relative steering angle by using the inexpensive motor position detection sensors will be described and then an embodiment of the invention will be described.

The relative steering angle estimating portion is further divided into a portion related to a self-diagnostic means for self-determining the abnormality of the position detection sensors for outputting binary values and a portion for estimating the relative steering angle that is the relative steering angle by using the position detection sensors.

Therefore, a detection principle of the self-diagnostic means for determining the abnormality of the position detection sensor for outputting the binary value will be described first and then a principle of estimation of the relative steering angle by using the output of the position detection sensor will be described.

Figure 1:
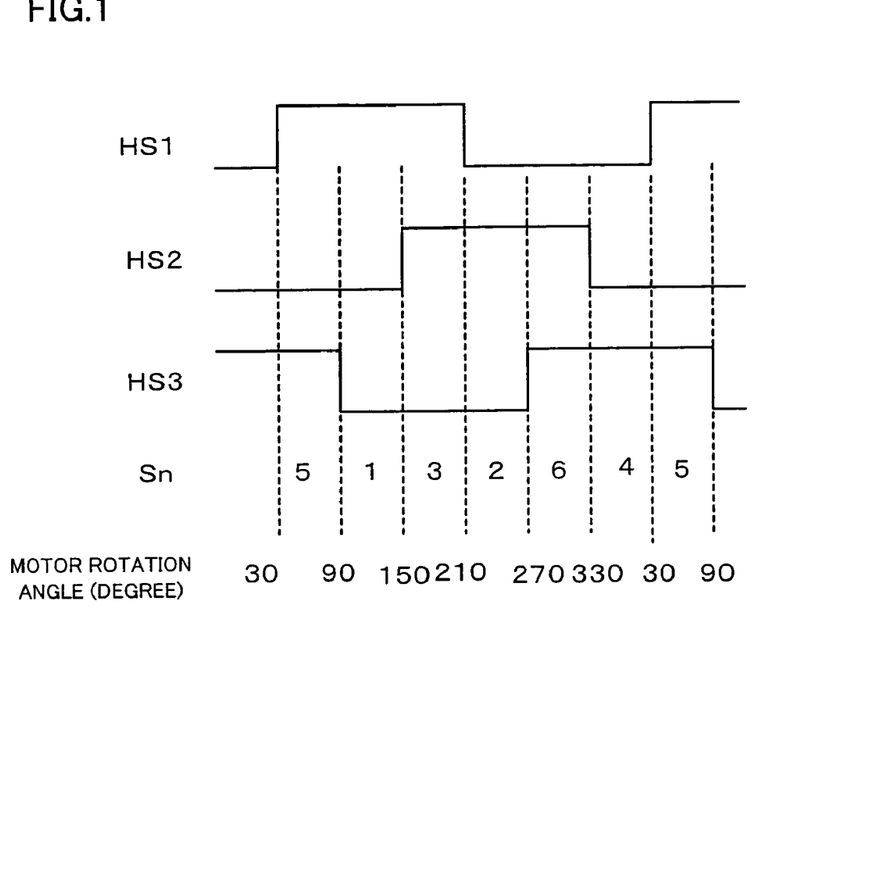
FIG. 1 is a drawing showing a relationship between a rotation position of a motor and an output value of a state function when outputs of Hall sensors are input.

A principle in a case in which three Hall sensors HS1, HS2, and HS3 are disposed at a stat or of a motor 108 as the position detection sensors for detecting a position of a rotor of the motor 108 to detect the position of the rotor will be described below. The Hall sensor taken as an example of the position detection sensor for outputting the binary value is generally available as an inexpensive part. Relationships among the binary outputs when the three Hall sensors HS1, HS2, and HS3 are disposed at an equal interval of 120° at the stator of the motor 108 are shown in FIG. 1. The output of HS1 changes from "0" to "1" or from "1" to "0" at every 180°. The output of HS2 changes from "0" to "1" or from "1" to "0" at every 180° with a 120° phase shift from the output of HS1. The output of HS3 changes from "0" to "1" or from "1" to "0" at every 180° with a 240° phase shift from HS1 and with a 120° phase shift from HS2.

Here, a state function to which the output values of HS1, HS2, and HS3 are input is determined. An output value of the state function is in a one-to-one relationship with each rotation position of the motor without redundancy. As an example, an expression 1 is utilized as the state function.

$$S = 4 \cdot [HS3] + 2 \cdot [HS2] + [HS1]$$
$$= 2^2 \cdot [HS3] + 2^1 \cdot [HS2] + 2^0 \cdot [HS1]$$

(Expression 1)

Here, [HS1], [HS2], and [HS3] are the output values of HS1, HS2, and HS3, respectively, and take on either one of "0" and "1". The state function S is not limited to the above expression 1 and another function may be used if an output value $S_n$ (hereinafter, referred to as a "state value $S_n$") of the state function S is in a one-to-one relationship with the rotation position of the motor without redundancy.

FIG. 1 shows a result of calculation of the state function S of the expression 1. From FIG. 1, it can be understood that the position of the rotor of the motor at every 60° is in a one-to-one relationship with the state value $S_n$. In FIG. 1, a direction of a rightward movement, e.g., a direction in which the value $S_n$ moves from "5", to "1" and from "1" to "3" is a clockwise rotation (hereinafter, referred to as CW). Reversely, a direction of a leftward movement, e.g., a direction in which the value $S_n$ moves from "5" to "4" and from "4" to "6" is a counterclockwise rotation (hereinafter, referred to as CCW).

Figure 2:
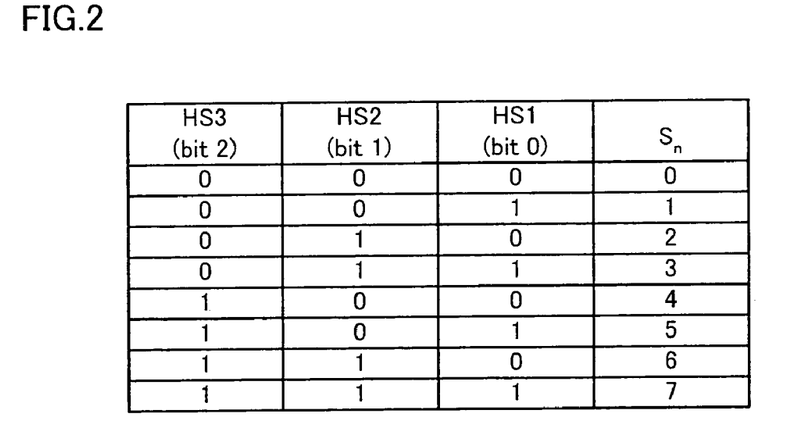
FIG. 2 is a drawing showing relationships among the output values of the Hall sensors and a state value $S_n$.

Relationships among the output values of the respective HS and the state value $S_n$, which is the output value of the state function S, are shown in FIG. 2. In FIG. 2, although "0" and "7" of the state value $S_n$ are not defined as rotation positions, they are listed, because they are possible to exist as the output values of the state function S. To put it concretely, when one of the Hall sensors gets out of order and the output of it is constantly "0" or "1", "0" and "7" exist as the state value $S_n$.

Figure 3:
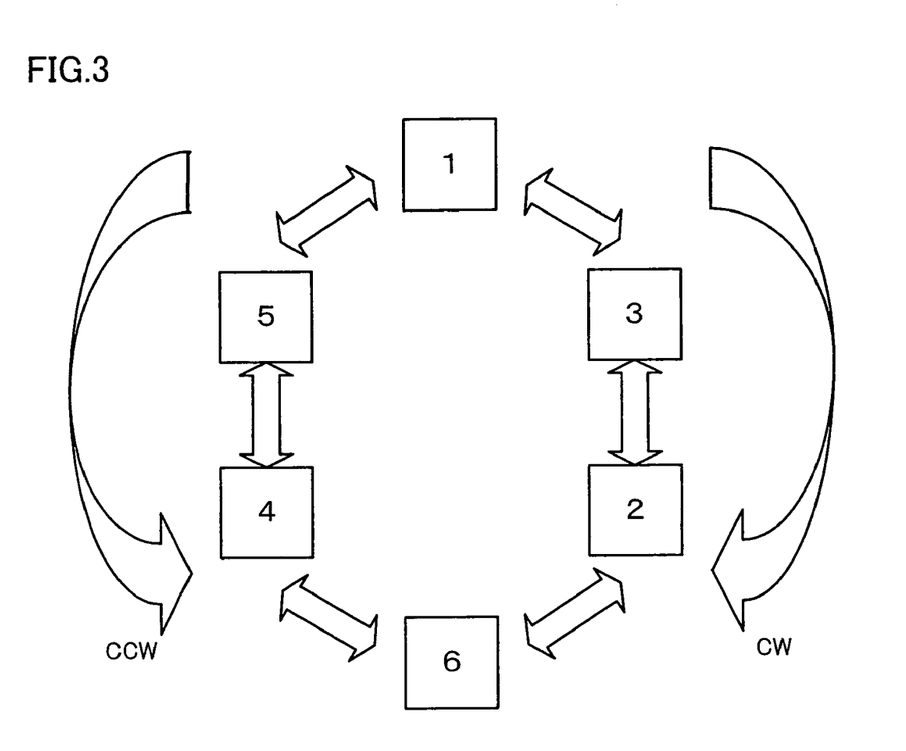
FIG. 3 is a drawing showing a relationship between a rotating direction of the motor and the state value $S_n$.

FIG. 3 is a drawing for making relationships between CW and CCW which are the rotating directions and the output value of the state value $S_n$ easy to understand and shows the relationship between the rotating direction of the motor and the state value $S_n$. It can be understood from FIG. 3 that a relationship of movement from a certain state value $S_n$ to another state value $S_{n+1}$ is fixed. For example, if the state value $S_n$ is "1", then the value certainly moves to "3" in a case of the direction CW while moves to "5" in a case of the direction CCW. Therefore, the state value $S_n$ does not directly move from "1" to "2", "4", or "6" and such movement is regarded as abnormal.

Figure 4:
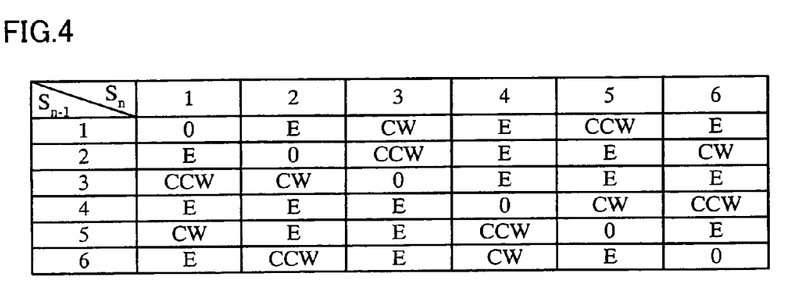
FIG. 4 is a drawing showing relationships among state values $S_{n-1}$, $S_n$ before and after a predetermined time, the rotating direction, and the abnormality of the rotating direction detection.

A relationship of a change of the state value $S_n$ from a certain time to the next time is shown in FIG. 4. FIG. 4 shows a relationship between a state value $S_{n-1}$ which is an output value of the state function S at a certain time and the next state value $S_n$. In FIG. 4, if the state value $S_{n-1}$ at a certain time is "1" and the next state value $S_n$ is "3", the rotating direction is CW and therefore "CW" is indicated in a position of a point of intersection of $S_{n-1}$ and $S_n$ in FIG. 4. If the next state value $S_n$ is "5", the rotating direction is CCW and therefore "CCW" is indicated in a position of a point of intersection of $S_{n-1}$ and $S_n$. Here, if $S_{n-1}$ is "1" and $S_n$ is "1", this represents a rotation stop in which the motor does not rotate and is at a standstill in the same position and therefore "0" is indicated in a position of a point of intersection of $S_{n-1}$ and $S_n$. Incidentally, if $S_{n-1}$ is "1" and $S_n$ is "2", "4", or "6", this represents an abnormality and therefore "E" is indicated.

Figure 5:
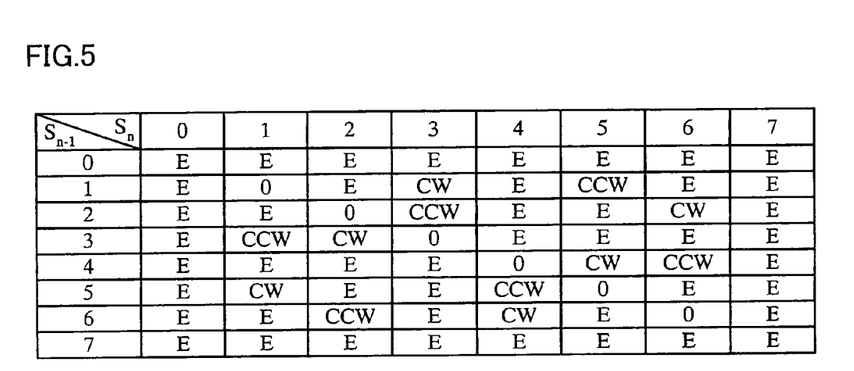
FIG. 5 is a drawing showing relationships among state values $S_{n-1}$, $S_n$, the rotating direction, and abnormality of the rotating direction detection with abnormalities of the Hall sensors in view.

If a failure of the Hall sensor is considered, "0" and "7" of the state value $S_n$ exist and therefore it can be said that FIG. 5 indicates every case. Therefore, "E" is indicated at every intersection with "0" or "7" of the state value $S_{n-1}$ or $S_n$ premised on the abnormality of the Hall sensor.

FIG. 5 means that the rotating direction of the motor and the detection abnormality can immediately be determined if a state value $S_n$ at a certain time and a state value $S_{n+1}$ at the next time are obtained. This relationship is defined as in an expression 2.

$$X=T[S_{n-1}]/[S_n]$$

(Expression 2)

According to the expression 2, rotation in the direction CW is output as "1", rotation in the direction CCW is output as "−1", a rotation stop is output as "0", and the detection abnormality E is output as "127" as the output value X, because the relationship of the rotation in the direction CW, the rotation in the direction CCW, the rotation stop, or the detection abnormality is recognized from the relationship in the table in FIG. 5 if the state value $S_{n-1}$ at a certain time and a state value $S_n$ at the next time are obtained. Therefore, it is possible to immediately recognize the rotating direction of the motor and the detection abnormality (abnormality is indicated in the self-diagnosis) by seeing the output X at one time.

The above is the explanation of the detection principle of the self-diagnostic means of the relative steering angle estimating portion.

Next, a detection principle of the relative steering angle, which is the remaining half of the relative steering angle estimating portion, will be described below. From FIG. 5, if there is no detection abnormality, it can immediately be recognized that the motor is rotating in the direction CW, that the motor is rotating in the direction CCW, or that the motor is in the stop state of rotation. Therefore, as the value of the output X defined in the expression 2, the rotation in the direction CW is output as "1", the rotation in the direction CCW is output as "−1", and the stop state of the rotation is output as "0". If the three Hall sensors are disposed at equal intervals of 120°, "1" represents an amount corresponding to 60°. These angles of 120° and 60° represent electrical angles and hereinafter, angles represent electrical angles.

Therefore, if a relationship from a state value $S_n$ at a certain time to a state value $S_{n+1}$ at the next time is "1", it can be recognized that the motor rotates 60° in the direction CW. Then, if a relationship of a change from the state value $S_{n+1}$ to a state value $S_{n+2}$ is also "1", it can be recognized that the motor further rotates 60° in the direction CW. Reversely, if a relationship from a state value $S_n$ at a certain time to a state value $S_{n+1}$ at the next time is "−1", it can be recognized that the motor rotates 60° in the direction CCW. If a relationship from a state value $S_n$ at a certain time to a state value $S_{n+1}$ at the next time is "0", it means that the motor is not rotating but is stopped. Therefore, from the relationships in FIG. 5, the relative rotation position of the motor can be determined by adding the output value X, i.e., "1", "−1", or "0" representing rotation in the direction CW, rotation in the direction CCW, or the stop, respectively to the previous state and integrating the addition results. In other words, an addition may be performed as shown in the following expression (3) to obtain an addition result.

$$C_n t = C_n t + X \qquad \text{(Expression 3)}$$

In other words, if a result of an addition of the output value X to the previous addition result $C_{nt}$ is defined as a new addition result $C_{nt}$, addition results are integrated and the relative motor rotation angle can be calculated.

Next, from the number of times of rotation of the motor, a steering wheel steering angle $A_n$ can be calculated. This steering wheel steering angle $A_n$ is a steering angle used for calculating a relative steering angle RA of a steering shaft (hereinafter, referred to as a steering wheel relative steering angle RA).

First, the steering wheel steering angle $A_n$ is calculated. In order to calculate the steering wheel steering angle $A_n$, a gear ratio of a worm and the like need be considered. This, relationship is different depending on the electric power steering apparatus. In a case of a three-phase four-pole motor, for example, the relationship is expressed as in an expression 4.

$$A_n = K \cdot C_n t + T_n / Kt \qquad \text{(Expression 4)}$$

Here, K=60°/2/G. G represents the gear ratio of the worm gear. The second term, $T_n/Kt$ represents a torsion angle of a torsion bar and the torsion angle is also taken into consideration to perform the addition. $T_n$ represents a torque value detected at the same time as the state value $S_n$ and Kt represents a spring constant.

Next, the steering wheel relative steering angle RA is calculated. First, the steering wheel relative steering angle RA can be calculated as the following expression 5.

$$RA = A_n - A_{n-m} \qquad \text{(Expression 5)}$$

Wherein, $A_n$ represents a steering wheel steering angle at a certain time and $A_{n-m}$ represents a steering wheel steering angle m steps before the certain time. The steering wheel steering angle $A_n$ is the relative steering angle and therefore need not be absolutely accurate.

Also, a steering velocity of the steering wheel Vh is calculated.

In other words, in order to calculate the steering velocity of the steering wheel Vh, a time $t_m$, which has been required for changes of m steps, is known and therefore the expression 6 may be performed by using the steering wheel relative steering angle RA and the time $t_m$.

$$Vh = RA/t_m \qquad \text{(Expression 6)}$$

If $t_m$ is set at a time such as 100 ms, for example, the steering velocity of the steering wheel Vh can be calculated directly from the expression 6.

The above are theoretical description of simultaneous detection of the abnormality of the rotating direction detection (self-diagnosis) and the rotating direction when the rotating direction detection is normal and theoretical description of calculation of the steering wheel relative steering angle RA (relative steering angle RA of the steering shaft).

Embodiment

Next, the preferred embodiment of the invention will be described specifically based on the drawings.

The embodiment will be described by dissecting it in the portion for estimating the relative steering angle by using the Hall sensors and the portion for determining the abnormality by comparing the steering angle (absolute steering angle) detected by the steering angle sensor and the relative steering angle obtained by estimation and calculation.

First, the portion for estimating the relative steering angle by using the Hall sensors and the self-diagnostic means will be described with reference to the drawings. Control processing which will be described below is performed every predetermined time. The predetermined time is a time required for 1 step from an n step, which is a certain state, to an (n+1) step which is the next state. This predetermined time is determined by considering all things such as performance of CPU of a control unit and detection velocities of detection sensors.

Figure 6:
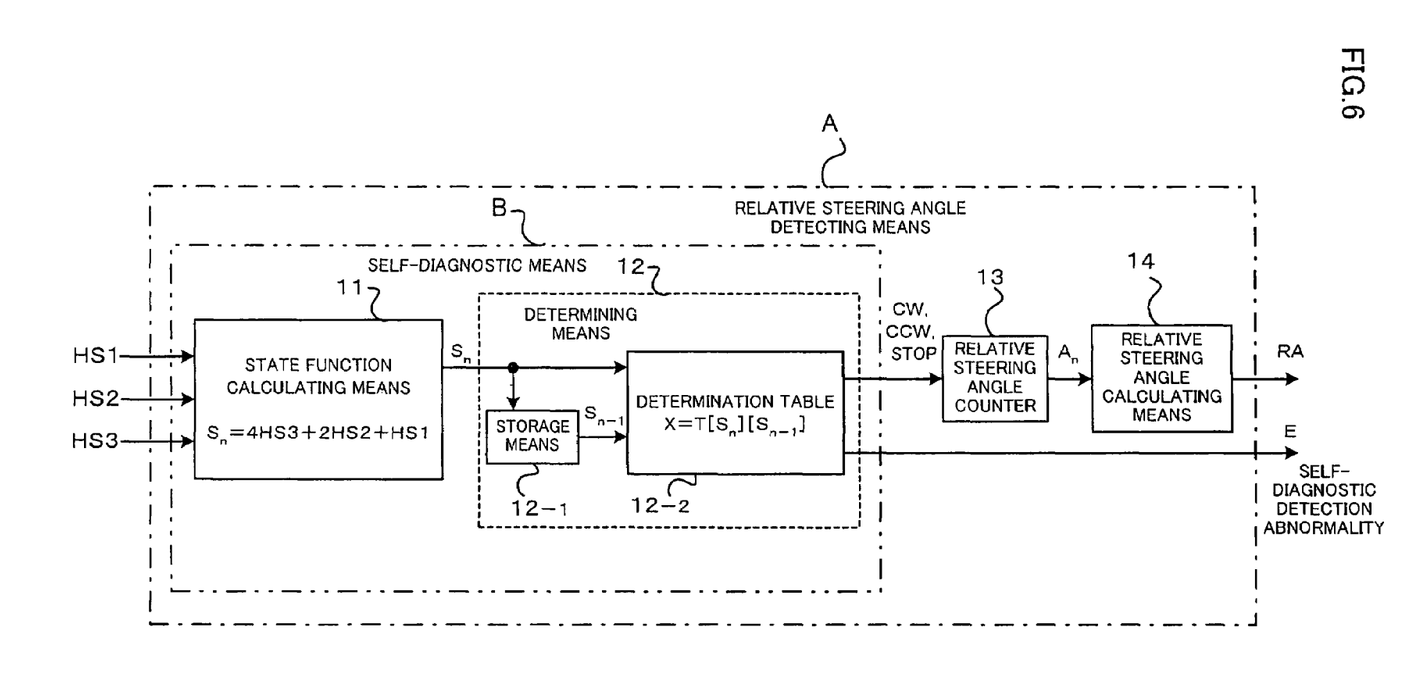
FIG. 6 is a control block diagram of the invention.

FIG. 6 is a control block diagram related to the self-diagnostic means B and the relative steering angle detecting means A.

Outputs HS1, HS2, and HS3 of the Hall sensors are input to the self-diagnostic means B and the means B detects the abnormality of the rotating direction detection (self-diagnosis) and the rotating direction when the rotating direction detection is normal at one time.

A configuration of the self-diagnostic means B includes the Hall sensors HS1, HS2, and HS3 disposed in the motor, state function calculating means 11 to which the outputs of the sensors are input, and determining means 12 to which an output of the state function calculating means 11 is input. The determining means 12 is further consisted of storage means $12_{-1}$ and a determination table $12_{-2}$. The storage means $12_{-1}$ stores the state value $S_n$ which is the output of the state function calculating means 11 and outputs the state value $S_{n-1}$, of a state, which is one step before the processed step, to the determination table $12_{-2}$. The state value $S_n$ and the state value $S_{n-1}$ are input to the determination table $12_{-2}$ and the table $12_{-2}$ outputs a determination value X. The determination table $12_{-2}$ is a table for determining the rotating direction and the abnormality of the rotating direction detection shown in FIG. 5.

Figure 7:
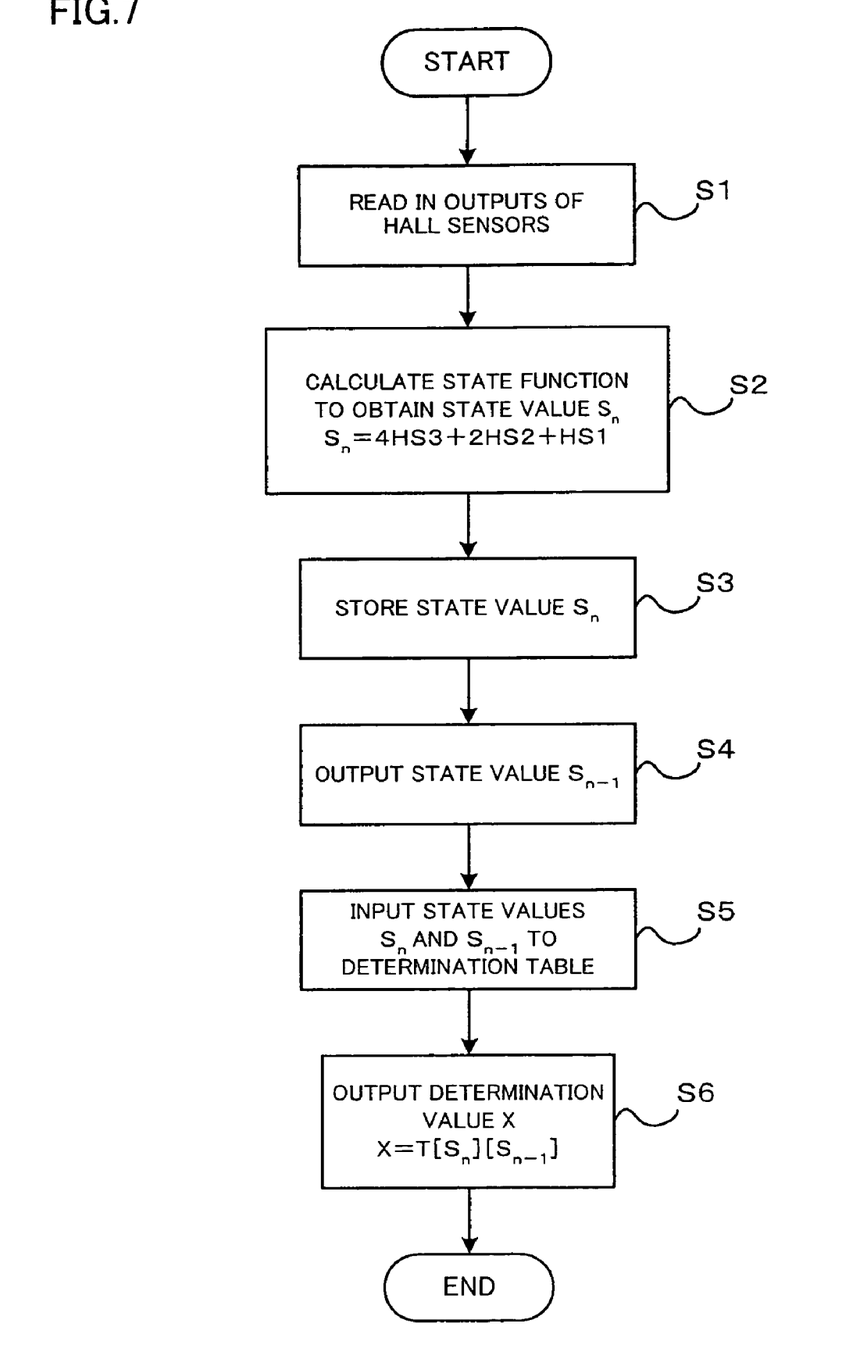
FIG. 7 is a flow chart of motor rotating direction detection and processing for determining the abnormality of rotating direction detection of the invention.

In this configuration of the self-diagnostic means B, operation of the configuration will be described with reference to a flow chart in FIG. 7. The Hall sensors HS1, HS2, and HS3 which are the position detection sensors output "0" or "1" which are binary outputs corresponding to the rotation position of the motor. The outputs "HS1", "HS2", and "HS3" of the Hall sensors are input to the state function calculating means 11 (step S1).

In this state function calculating means 11, $S_n = 4 \cdot \text{"HS3"} + 2 \cdot \text{"HS2"} + \text{"HS1"}$ which is the expression 1 is calculated. The state value $S_n$, which is a result of this calculation, is input to the determining means 12 (step S2). Calculation of the state function is performed every predetermined time.

The state value $S_n$ input to the determining means 12 is input to the storage means $12_{-1}$ and the determination table $12_{-2}$. First, the storage means $12_{-1}$ stores the state value $S_n$ (step S3). Then, the storage means $12_{-1}$ outputs the state value $S_{n-1}$, which is one step before the processed step, to the determination table $122_{-2}$ (step S4).

To the determination table $12_{-2}$, the state value $S_n$ and the state value $S_{n-1}$, which are output values of the state function before and after the predetermined time, are input (step S5). The determination table $12_{-2}$ immediately determines a relationship between the state value $S_n$ and the state value $S_{n-1}$. If the state value $S_n$ is "1" and the state value $S_{n-1}$ is "3", for example, the motor is rotating in the direction CCW. If the state value $S_n$ is "1" and the state value $S_{n-1}$ is "5", the motor is rotating in the direction CW. If the state value $S_n$ is "1" and the state value $S_{n-1}$ is "1", the motor is not rotating but is stopped. If the state value $S_n$ is "1" and the state value $S_{n-1}$ is "6", the rotation detection is abnormal.

The output of the determination table $12_{-2}$ is output as the output value X of the expression 2. In other words, the table $12_{-2}$ outputs "1" in the case of the CW rotation, "−1" in the case of the CCW rotation, "0" in the case of the rotation stop, and "E" or "127" in the case of the abnormality of the rotation detection (step S6).

The rotating direction of the motor and the abnormality of the rotating direction detection can be detected at one time without using a conditional statement by using the table. When the output E of the self-diagnosis detection abnormality is output, in other words, a result of determination by the self-diagnostic means B that the motor rotating direction is abnormal is utilized for identifying normality of the steering angle sensor as will be described later. Reversely, when the output E of the self-diagnosis detection abnormality is not output, a result of determination by the self-diagnostic means B that the motor rotating direction is normal is utilized for identifying abnormality of the steering angle sensor.

Figure 8:
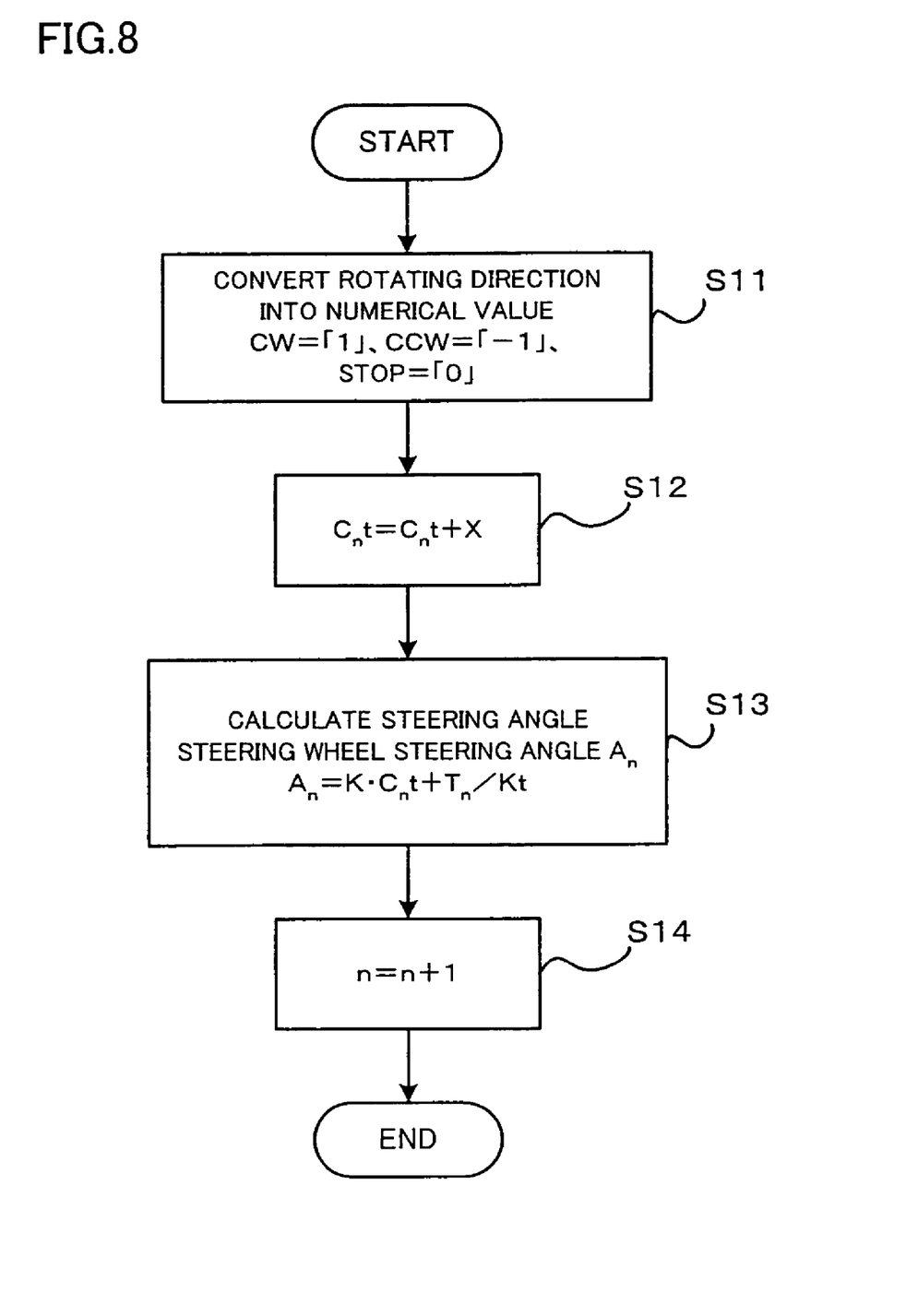
FIG. 8 is a flow chart for calculating a steering angle.
Figure 9:
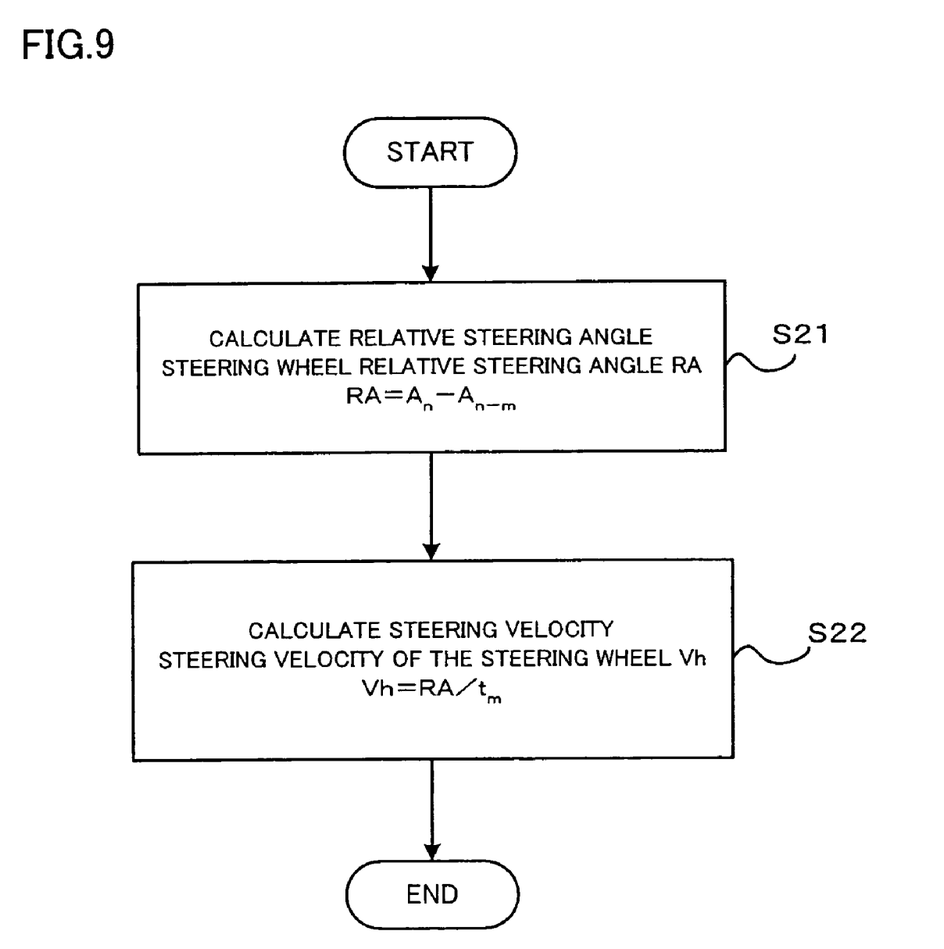
FIG. 9 is a flow chart for calculating a steering wheel relative steering angle and a steering velocity of the steering wheel.

Next, an embodiment of calculation of the steering wheel relative steering angle RA will be described with reference to the control block diagram in FIG. 6 and flow charts in FIG. 8 and FIG. 9.

First, the relative steering angle detecting means A is consisted of the self-diagnostic means B including the state function calculating means 11 and determining means 12, a relative steering angle counter 13, and a relative steering angle calculating means 14 as shown FIG. 6. In other words, from the self-diagnostic means B, the respective state signals of CW, CCW, and the stop representing the rotating directions are output in addition to the detection abnormality output E. These signals (CW, CCW, and the stop) representing the rotating directions are input to the relative steering angle counter 13 and the steering wheel steering angle $A_n$ is output. Next, the steering wheel steering angle $A_n$ is input to the relative steering angle calculating means 14 and the steering wheel relative steering angle RA is output.

First, a calculating procedure of the steering wheel steering angle $A_n$ by the relative steering angle counter 13 will be described with reference to the flow chart in FIG. 8. First, the CW rotation, the CCW rotation, the rotation stop, which are the rotating directions of the motor, are converted into numerical values. In the present embodiment, the determination table $12_{-2}$ carries out detection of the rotating direction and conversion of the rotating direction into the numerical value at one time. The CW rotation, the CCW rotation, and the rotation stop are converted into "1", "−1", and "0", respectively. In other words, X takes on any one of "1", "−1", and "0") step S11). Next, the numerical value X continues to be added every predetermined time, i.e., at every step to calculate the integrated value $C_n t$. In other words, an expression, $C_{nt} = C_{nt} + X$ is performed and, as a result, X is integrated to calculate the integrated value $C_n t$ (step S12).

Next, based on the expression, $A_n = K \cdot C_n t + T_n / K t$ defined by the expression 4, the steering wheel steering angle $A_n$ is calculated (step S13). Here, the torque $T_n$ is a torque value at an n step. Finally, the counter finishes the n step and performs counting corresponding to the (n+1) step (step S14). The above is the operation of the relative steering angle counter 13.

Next, the steering wheel relative steering angle RA is obtained. The steering wheel relative steering angle RA is calculated by the relative steering angle calculating means 14. The relative steering angle calculating means 14 performs the expressions 5 in the flow chart in FIG. 9. In other words, the steering wheel relative steering angle RA is calculated by subtracting a steering angle $A_{n-m}$ in a step m steps before the present n step from the steering angle $A_n$ in the present n step (step S21).

Moreover, if the calculated steering wheel relative steering angle RA is divided by a time $t_m$ required for the m steps, the steering velocity of the steering wheel Vh is calculated (step S22).

The above is the embodiment of the portion for estimating the relative steering angle by using the Hall sensors. Next, the embodiment of the portion for determining the abnormality of the steering angle sensor by using the steering angle θs (absolute steering angle) detected by the steering angle sensor 112 and the steering wheel relative steering angle RA estimated by the above-described method will be described with reference to the control block diagram in FIG. 10 and the flow chart in FIG. 11.

A determination principle of abnormality determination will be described first and then the embodiment will be described with reference to FIGS. 10 and 11.

Here, a change amount Δθs of the steering angle θs, which is input to the abnormality determining means C, is an amount of change from a value θs0 read in as an initial value by the steering angle sensor 112. In other words, a relational expression 7 holds.

$$\Delta\theta s = \theta s - \theta s 0 \qquad \text{(Expression 7)}$$

Likewise, a change amount ΔRA of the relative steering angle, which is another input to the abnormality determining means C, is an amount of change from a value RA0 read in as an initial value of the steering wheel relative steering angle RA. In other words, a relational expression 8 is established.

$$\Delta RA = RA - RA0 \quad \text{(Expression 8)}$$

If the steering angle θs which is the absolute steering angle detected by the steering angle sensor 112 is detected normally and the steering wheel relative steering angle RA which is the relative steering angle estimated by the relative steering angle detecting means A is calculated normally, Δθs=ΔRA. If either one of steering angle θs and steering wheel relative steering angle RA is abnormal, Δθs=ΔRA does not hold. However, in view of a detection error of the steering angle sensor and a calculation error of the relative steering angle, it is possible to determine which of the steering angle θs detected by the steering angle sensor and the calculated relative steering angle RA is abnormal by determining whether or not |Δθs−ΔRA|, which is a difference between the change amount Δθs and the change amount ΔRA, is greater than a predetermined value Δθth as shown in an expression 9.

$$|\Delta\theta s - \Delta RA| > \Delta\theta th \quad \text{(Expression 9)}$$

Moreover, it is possible to know the abnormality of the calculation of the relative steering angle RA by self-diagnosis by the self-diagnostic means B and therefore, by adding this self-diagnosis to the determination result by the expression 9, the abnormality of the steering angle sensor 112 can be determined. The above is the determination principle of the abnormality determination.

Figure 10:
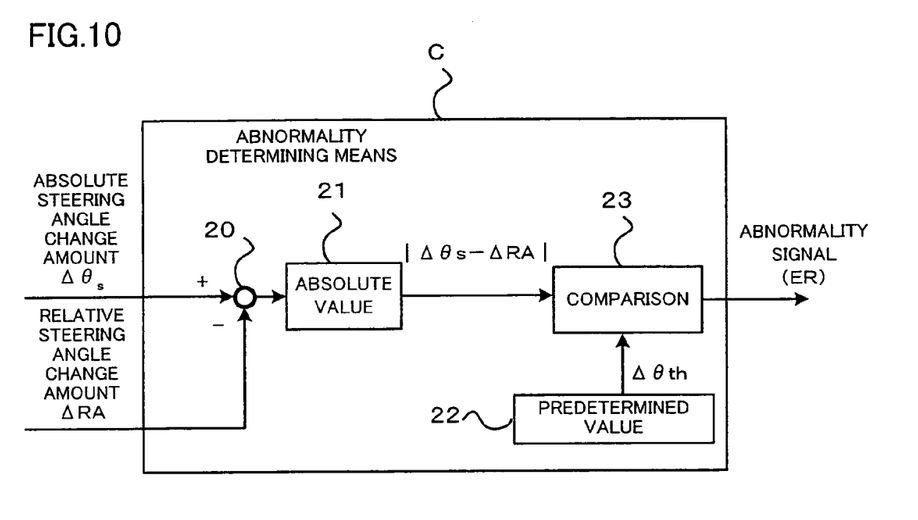
FIG. 10 is a control block diagram of abnormality determination.
Figure 11:
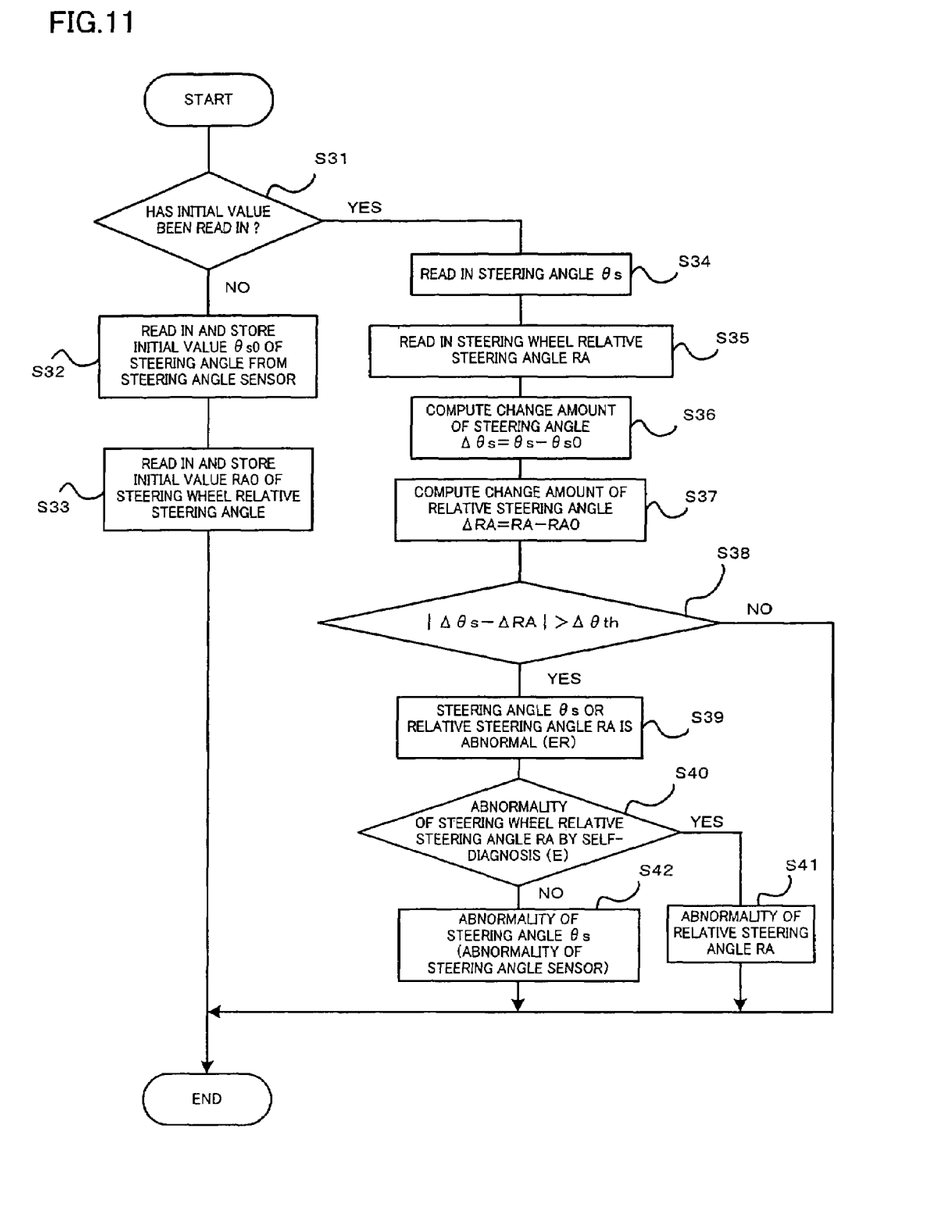
FIG. 11 is a flow chart of abnormality determination.

With reference to FIGS. 10 and 11, the embodiment will be described.

The abnormality determining means C is formed of a subtracting means 20, an absolute value means 21, a predetermined value setting means 22, and a comparing means 23.

In FIG. 10, the change amount Δθs of the steering angle θs, which is the absolute steering angle detected by the steering angle sensor 112 and the change amount (relative steering angle) ΔRA of the steering wheel relative steering angle RA calculated by the relative steering angle calculating means A, are input to the subtracting means 20 to calculate the difference (Δθs−ΔRA) and the absolute value means 21 calculates the absolute value |Δθs−ΔRA|.

Next, the predetermined value setting means 22 compares the set predetermined value Δθth and the absolute value |Δθs−ΔRA| which is the output of the absolute value means 21 with each other. If the absolute value |Δθs−ΔRA| is smaller than the predetermined value Δθth, it is determined that both the steering angle Δθs and steering wheel relative steering angle RA are normal. Reversely, if the absolute value |Δθs−ΔRA| is greater than the predetermined value Δθth, it is determined that either one of the steering angle θs and steering wheel relative steering angle RA is abnormal and an abnormality signal (ER) is output.

Moreover, by combining the signal (E) of the abnormality of the self-diagnostic detection output by the self-diagnostic means B with the above signal, it is possible to specify which of the steering angle θs and the steering wheel relative steering angle RA is abnormal. For example, if the abnormality determining means C determines the abnormality to output the abnormality signal (ER) while the self-diagnostic means B does not output the signal (E) of the abnormality of the self-diagnostic detection means (i.e., if it is determined that the self-diagnostic means is normal), it is possible to determine that detection of the steering angle θs is abnormal. In this case, there is an extremely high probability that the steering angle sensor 112 is abnormal.

The above will be described with reference to the flow chart in FIG. 11 as follows.

Whether or not initial values of the steering angle θs which is the output of the steering angle sensor and the steering wheel relative steering angle RA have been read in is determined (step S31). If they have not been read in (NO), the steering angle θs0, which is the initial value from the steering angle sensor, is read in and stored (step S32). Likewise, the initial value RA0 of the steering wheel relative steering angle RA (calculated in step S21) is read in and stored (step S33).

On the other hand, if the initial values have been read in and stored (YES), the processing advances as follows. The steering angle θs detected by the steering angle sensor in a cycle programmed in the CPU is read in (step S34). Next, the steering wheel relative steering angle RA calculated in step S21 is read in (step S35). The change amount Δθs=θs−θs0 of the steering angle is calculated (step S36). Likewise, the change amount ΔRA=RA−RA0 of the steering wheel relative steering angle is calculated (step S37).

Whether or not an error between the change amount Δθs of the steering angle and the change amount ΔRA of the steering wheel relative steering angle is greater than the predetermined value Δθth is determined (step S38). If the error is smaller than the predetermined value (NO), both the steering angle and relative steering angle are normal and therefore the determination in this cycle is completed.

If the error is greater than the predetermined value (YES), either one of the steering angles θs and the steering wheel relative steering angle RA is abnormal. The abnormality signal (ER) is output (step S39). Whether or not the self-diagnostic detection abnormality signal (E) detected by the self-diagnostic means B has been output is determined (step S40). If the self-diagnostic detection abnormality signal (E) has been output (if the self-diagnostic means determines abnormality) (YES), it is possible to specify that the steering wheel relative steering angle RA is abnormal (step S41). If the self-diagnostic detection abnormality signal (E) has not been output (if the self-diagnostic means determines normality) (NO), it is possible to determine that the steering angle θs is abnormal (step S42).

As described above, it is possible to detect the abnormality of the steering angle θs including the abnormality of the steering angle sensor. If the abnormality of the steering angle sensor 112 is detected, the steering angle θs is not an input signal absolutely necessary for controlling the electric power steering apparatus and therefore it is possible to carry out relatively better control by interrupting input of the steering angle θs with a steering angle interrupting means (not shown) and without using the steering angle θs from the steering angle sensor 112 than by using the steering angle θs which is an erroneous signal. The steering angle interrupting means is controlled by the abnormality signal (ER). Alternatively, it is also possible to control the steering angle interrupting means by using the steering wheel relative steering angle RA instead of the steering angle θs when the steering angle sensor 112 is abnormal.

Moreover, if it is impossible to determine which of the steering angle θs and the steering wheel relative steering angle RA is abnormal, it is conceivable that control is carried out control without using the steering angle θs from the steering angle sensor 112. In other words, if the steering angle sensor is abnormal, it may be better for a driver to carry out the control without using the steering angle θs than to carry out erroneous control by using the erroneous steering angle θs in some cases.

Although the example in which the Hall sensors are used as the position detection sensors for outputting binary values has been described in the embodiment, the position detection sensor is not limited to the Hall sensor or a Hall IC.

As described above, with the invention, it is possible to expect the effect of accurate detection of the abnormality of the steering angle sensor by using the inexpensive position detection sensors.

POSSIBILITIES OF INDUSTRIAL APPLICATION

With the control unit for the electric power steering apparatus according to the invention, by detecting the relative steering angle by using the inexpensive position detection sensors for outputting the binary values to compare the relative steering angle and the steering angle detected by the steering angle sensor with each other, it is first possible to detect which is abnormal and to diagnose itself as abnormal in detection of the relative steering angle. Therefore, by adding the result of the self-diagnosis, it is possible to detect the abnormality of the steering angle sensor.

If there is a possibility that the steering angle is abnormal, it is possible to carry out more accurate control by controlling the electric power steering apparatus without the input signal of the steering angle than by controlling the electric power steering apparatus by using the erroneous input signal of the steering angle.

What is claimed is:

1. A control unit for an electric power steering apparatus including a steering angle sensor for detecting a steering angle of a steering shaft and being controlled to apply a steering assist force by a motor to a steering system of a vehicle, the control unit comprising:
   a plurality of position detection sensors for outputting binary values according to a rotation position of the motor;
   a relative steering angle detecting means for detecting a relative steering angle of the steering shaft from binary outputs of the position detection sensors; and
   an abnormality determining means for determining that the steering angle sensor or the relative steering angle detecting means is abnormal when a difference between a change amount of the steering angle and a change amount of the relative steering angle is greater than a predetermined value to output an abnormality signal.

2. A control unit for an electric power steering apparatus according to claim 1, the control unit further comprising a self-diagnostic means for determining an abnormality of the relative steering angle,
   wherein the control unit determines that the steering angle sensor is abnormal when the abnormality determining means outputs the abnormality signal and the self-diagnostic means determines that the relative steering angle is normal.

3. A control unit for an electric power steering apparatus according to claim 1, the control unit further comprising a steering angle interrupting means for interrupting input of the steering angle from the steering angle sensor,
   wherein the input of the steering angle output from the steering angle sensor is interrupted by the steering angle interrupting means when the abnormality determining means outputs the abnormality signal and the motor is controlled without using the steering angle.

4. A control unit for an electric power steering apparatus according to claim 2, the control unit further comprising steering angle interrupting means for interrupting input of the steering angle from the steering angle sensor,
   wherein the input of the steering angle output from the steering angle sensor is interrupted by the steering angle interrupting means when the abnormality determining means outputs the abnormality signal and the motor is controlled without using the steering angle.

* * * * *